May 13, 1958    M. B. FELDMAN ET AL    2,834,280
LOUVER
Filed Feb. 10, 1954    5 Sheets-Sheet 1
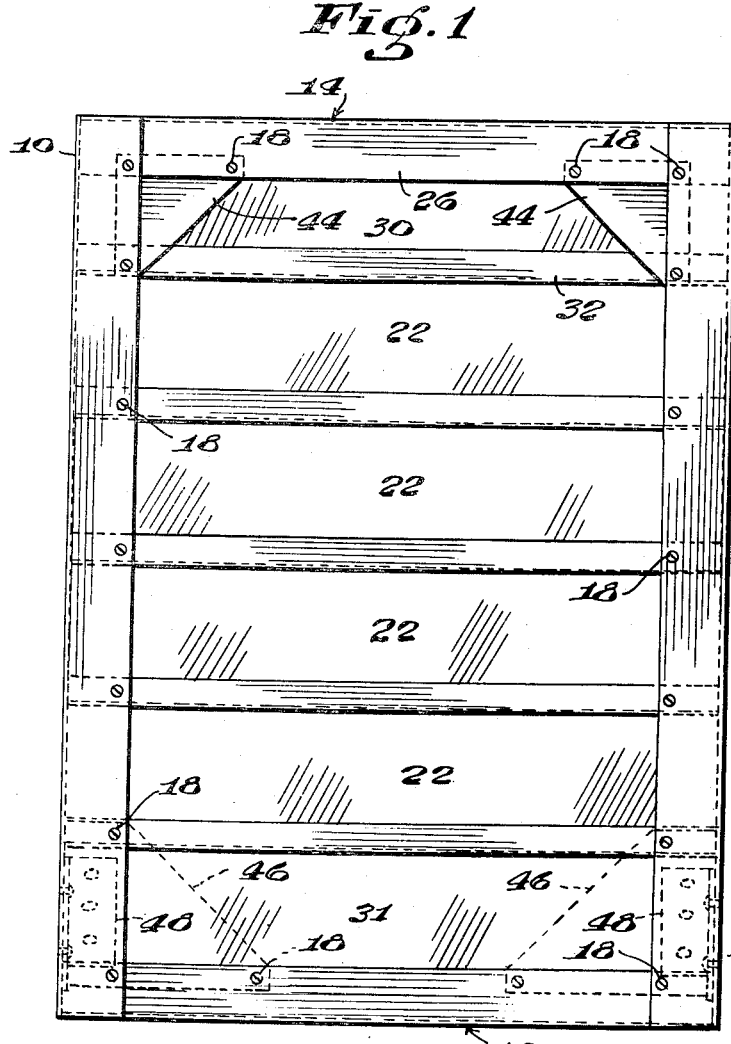
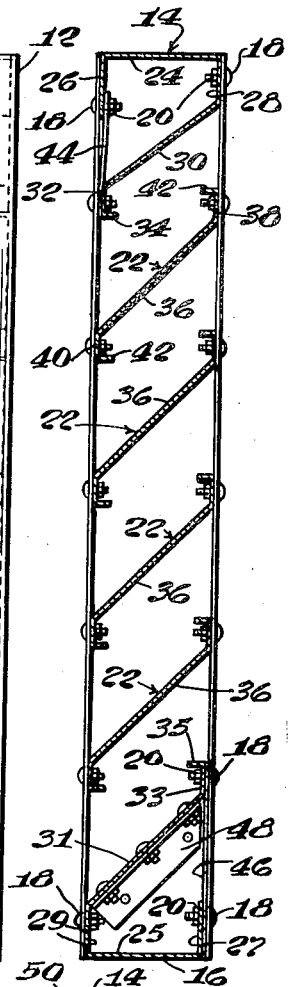
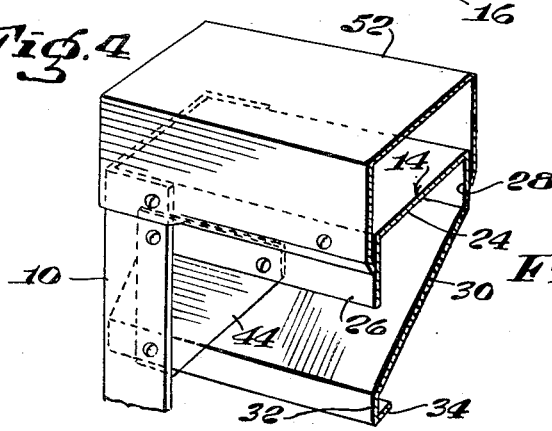
INVENTORS.
Max B. Feldman
BY Oscar E. Roseman
J. Stanley Churchill
ATTORNEY

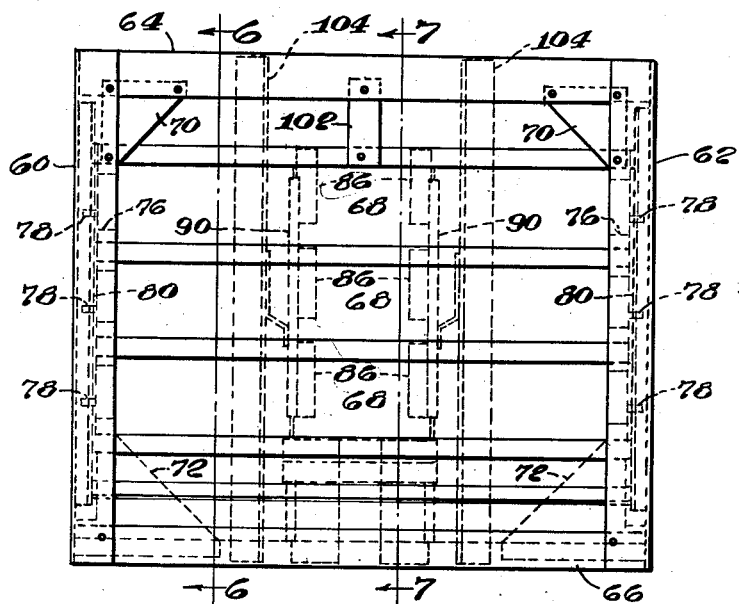
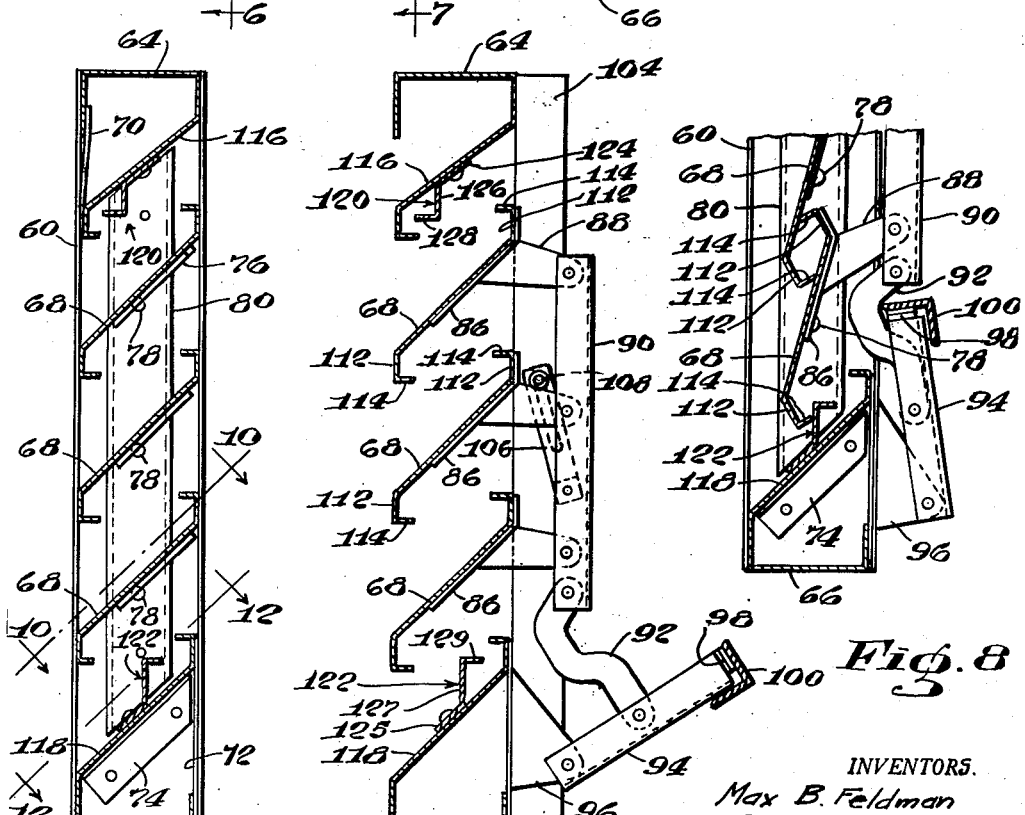

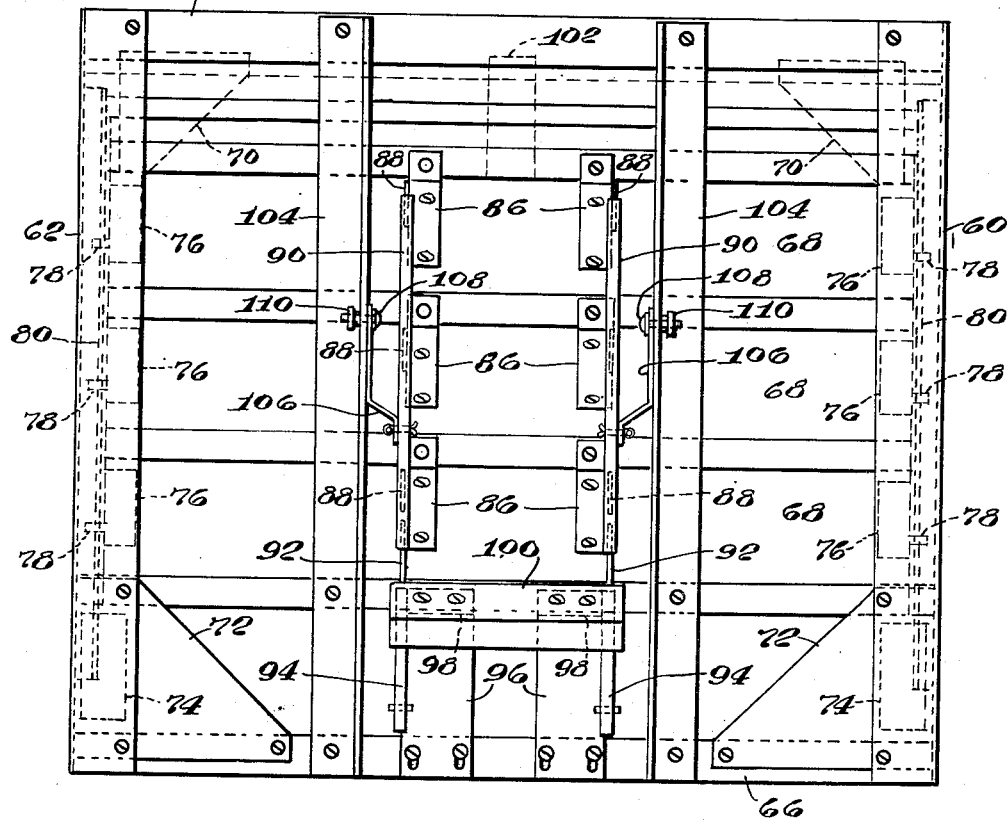
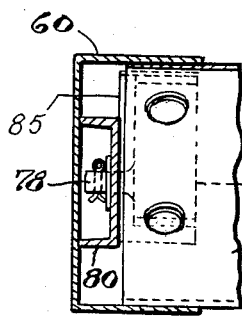
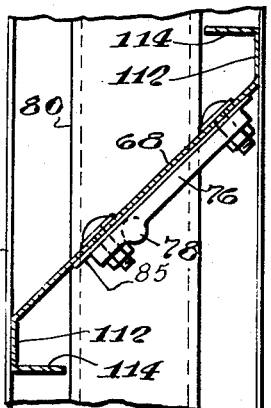
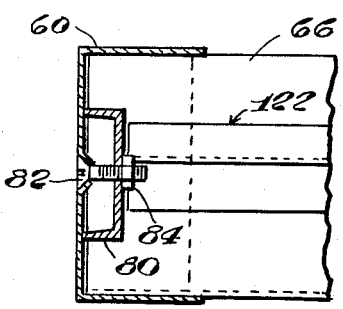

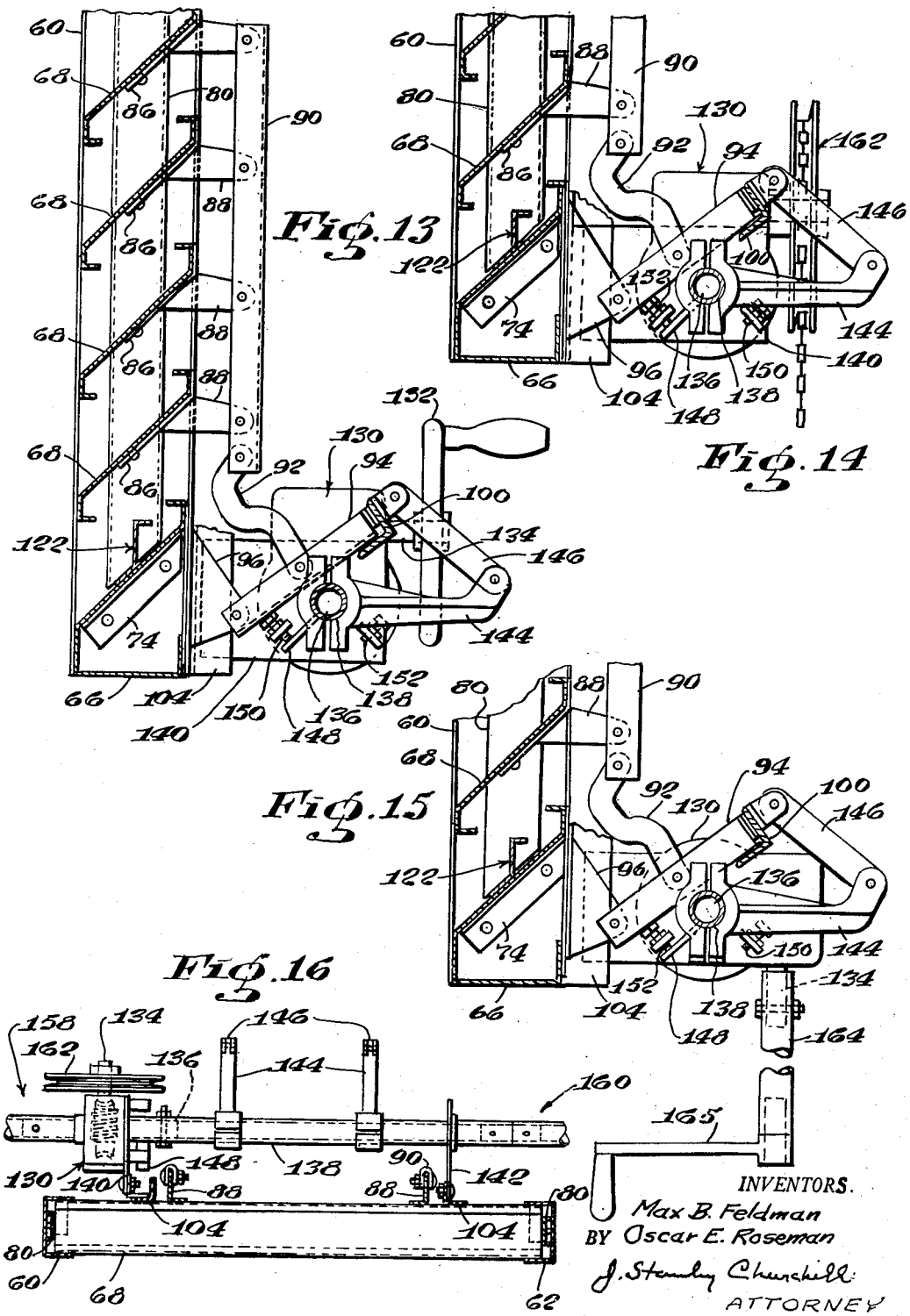

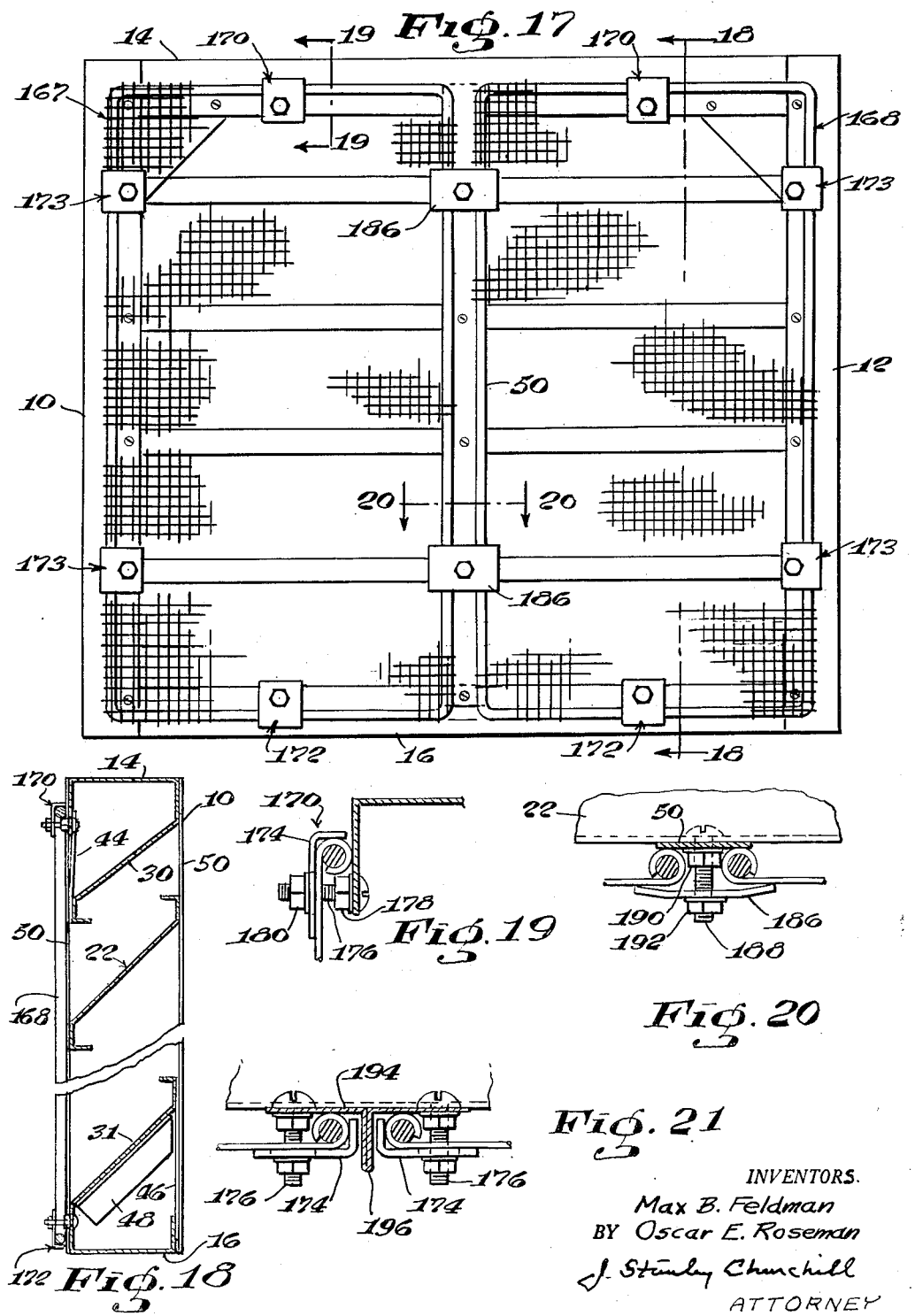

United States Patent Office 2,834,280
Patented May 13, 1958

2,834,280

LOUVER

Max B. Feldman, Pittsburgh, and Oscar E. Roseman, Leetsdale, Pa., assignors to H. H. Robertson Company, Pittsburgh, Pa., a corporation of Pennsylvania Application February 10, 1954, Serial No. 409,356

5 Claims. (Cl. 98—88)

This invention relates to a louver.

The invention has for an object to provide a novel, simplified and improved construction of louver capable of being economically manufactured in a variety of different sizes utilizing a minimum number of parts of predetermined cross-sectional shapes, and which is durable, rigid and highly efficient in operation.

With this general object in view and such others as may hereinafter appear, the invention consists in the louver structure hereinafter described and particularly defined in the claims at the end of this specification.

In the drawings illustrating the preferred embodiment of the invention:

Fig. 1 is a front elevation of the present louver structure embodying fixed louver blades;

Fig. 2 is a vertical sectional view of the louver shown in Fig. 1;

Fig. 3 is a view similar to Fig. 1 showing a central mullion strip for use with a relatively wide louver;

Fig. 4 is a perspective detail view, partly in cross section, showing a flashing member attached to the upper portion of the louver;

Fig. 5 is a front elevation of a louver structure illustrating the invention as embodied in a louver of the type having adjustable blades;

Fig. 6 is a cross-sectional view of the same taken on the line 6—6 of Fig. 5;

Fig. 7 is a cross-sectional view taken on the line 7—7 of Fig. 5;

Fig. 8 is a detail view in cross section of a portion of the structure shown in Fig. 7 and illustrating the adjustable louver blades in their closed position;

Fig. 9 is a rear view of the louver structure shown in Fig. 5;

Fig. 10 is a cross-sectional plan view detail illustrating the pivot arrangement for the adjustable blades, as seen from the line 10—10 of Fig. 6;

Fig. 11 is a cross-sectional side elevation detail of the arrangement shown in Fig. 10;

Fig. 12 is a cross-sectional plan view detail taken on the line 12—12 of Fig. 6;

Fig. 13 is a detail view in cross section showing a louver of the adjustable type provided with a worm and gear operator of the hand wheel type;

Fig. 14 is a similar view illustrating a chain and pulley actuated worm gear operator;

Fig. 15 is a similar view showing the worm gear operator provided with a pipe shaft extension having a handle at its other end;

Fig. 16 is a plan view detail showing the manner of mounting the worm gear operator;

Fig. 17 is a front elevation of the present louver illustrating screens attached thereto;

Fig. 18 is a cross-sectional view taken on the line 18—18 of Fig. 17;

Fig. 19 is a cross-sectional detail view taken on the line 19—19 of Fig. 17;

Fig. 20 is a cross-sectional detail view taken on the line 20—20 of Fig. 17 showing the screen attaching arrangement at the central mullion strip of a fixed louver structure; and Fig. 21 is a similar view showing the screen attachment employed in an adjustable type louver structure.

In general the present invention relates to a prefabricated sheet metal louver of the type adapted to be placed in a wall opening of a building for light and ventilation, and contemplates a novel and simplified construction of louver having a minimum number of different parts and which lends itself to economical manufacture in a variety of predetermined standard sizes. In accordance with the present invention, the various parts of the louver are preferably of predetermined cross-sectional shapes which may be cut to length for predetermined heights and widths of louvers and which are adapted to be quickly and easily assembled to produce an efficient louver in a simple and economical manner.

The invention is herein illustrated as embodied in louver structures of either the fixed blade type or the movable blade type adapted to be opened and closed, and provision is made in the movable blade type of louver for adjusting the blades in intermediate positions in a novel and simple manner.

The cross-sectional shapes from which the louver is constructed are preferably such as to lend rigidity to the sheet metal structure, and in both the fixed blade type and the movable blade type the upper and lower frame members are shaped to define an outwardly and downwardly inclined opening forming in effect fixed upper and lower louver surfaces between which the intermediate louver blades are arranged preferably in equally spaced relation. It will also be observed that the novel cross-sectional shape of the illustrated louver blades is such as to provide a double weather seal therebetween when the blades are moved to their closed position.

The different parts of the louver structure lend themselves to simple and economical manufacture, and while it is preferred to stock the parts in different lengths to form louvers arranged to fit various standard size wall openings, provision is made for enlarging the outer dimensions of the louver by the addition of novel filler or flashing members. The present louver frame is also arranged to be reinforced in a novel manner whereby to provide a relatively rigid and durable lightweight sheet metal louver. Novel provision is also made for attaching screening to the illustrated louver structure, as will be described.

Referring now to the drawings, and particularly to Figs. 1 and 2, illustrating the fixed type of louver structure, 10, 12 represent vertically extended sheet metal side frame members, U-shaped in cross section, and 14, 16 represent horizontally extended top and bottom frame members respectively secured at their ends to the inwardly extended legs of the U-shaped side frame members 10, 12 by bolts 18 and nuts 20, as shown. A plurality of horizontally extended and equally spaced louver blades 22 are disposed intermediate the top and bottom frame members 14, 16 and are also connected at their ends to the inwardly extended legs of the side frame members 10, 12.

The top and bottom frame members 14, 16 are of similar cross-sectional shape, the bottom frame member 16 being inverted with relation to the top frame member 14, and as herein shown, the top frame member includes a top wall 24 having a depending upper front flange 26, a depending rear wall or flange portion 28, a forwardly and downwardly inclined wall 30 connecting the rear wall portion to a lower front flange 32 terminating in a relatively short rearwardly extended rib 34.

The bottom frame member 16 is provided with substantially corresponding counterparts in inverted relation, including a bottom wall 25; an upwardly extended rear flange 27; an upwardly extended front flange 29; an upwardly and rearwardly inclined wall 31 connecting the front flange to a flange 33 terminating in a relatively short forwardly extended rib 35.

As thus defined it will be observed that the top and bottom frame members each provide inclined inner wall portions 30, 31 defining a frame opening forming in effect upper and lower louver surfaces. The louver blades 22 are shaped in cross section to provide an inclined blade portion 36, upwardly and downwardly extended flanges 38, 40 respectively coextensive with the blade portion 36, each flange terminating in a relatively short inwardly extended rib 42. In practice the louver blades may be inclined at an angle of approximately 45 degrees, and the inclined portions of the top and bottom frames may vary from 30 to 45 degrees, depending on the thickness of the louver structure.

In order to reinforce the sheet metal structure, upper and lower corner braces 44, 46 may be provided. The corner braces are substantially triangular in shape, the upper corner braces 44 being disposed at the front of the frame structure and the lower corner braces being disposed at the rear of the frame structure. As herein shown, the upper corner braces 44 are placed in back of the front flange 26 and against the flange 32 and are secured thereto and to the side frames 10, 12 by the bolts 18 and nuts 20 as shown. The lower corner braces 46 are interposed between the adjacent leg of the U-shaped side frames and the flanges 27, 33 and are likewise secured to the flanges and to the side frame by the bolts and nuts 18, 20. The bottom frame member 16 is further reinforced by an angle member 48, one leg of which may be riveted to the end walls of the side frames, the other leg being bolted to the ends of inclined wall portions 31 of the bottom frame member, as shown.

From the above description it will be observed that the structure of the present louver is such that the various parts may be formed from sheet metal in various predetermined cross-sectional shapes and cut off in different predetermined lengths for making louvers in various standard heights and widths to fit standard wall openings. In practice when the present louver extends beyond a predetermined width, the structure may be further reinforced by the provision of front and rear vertical mullion straps 50 centrally disposed and which may be bolted to the flanges of the top and bottom frames and to the louver blade flanges by bolts and nuts 18, 20, as shown.

The entire louver structure may and preferably will be made of sheet metal of suitable gauge, such as 18 to 22 gauge metal and may be made from plain or galvanized sheet metal or from sheet steel having a protective bituminous weather resistive coating bonded thereto. The structure may also be made in various depths or thicknesses for use in standard wall structures, such as four inch or six inch thick wall structures.

In practice when a standard size louver is too short in height to fit a particular wall opening, a novel filler member 52 may be fitted over and secured to one end of the louver, as illustrated in Fig. 4, to increase the height thereof. As herein shown, the filler member 52 may comprise a length of sheet metal formed into U-shape in cross section and which is arranged to fit over one end of the structure and to be secured thereto by the bolts and nuts 18, 20. As illustrated in detail in Fig. 4, the lower edges of the U-shaped filler member 52 are preferably bent inwardly slightly along the marginal edges so that they may hug the adjacent flange portions 26, 28 of the top frame member 14; the inwardly bent portions being flattened out where they engage and are secured to the upper ends of the side frame members 10, 12 as shown. In practice the bottom frame member 16 may have a similar inwardly bent portion along the marginal edge of the flange 27, and the mullion straps 50 may similarly be provided with inwardly bent marginal edges.

From the above description of the fixed type of louver, it will be observed that the present structure of sheet metal louver lends itself to simple and economical manufacture and may be easily and quickly assembled to produce an efficient, durable and relatively rigid louver structure.

Referring now to Figs. 5 to 12, the adjustable type of louver structure embodying the present invention is similar in construction to the fixed type above described except that provision is made for pivotally mounting the louver blades and for connecting the same to effect simultaneous movement and adjustment thereof in a simple and novel manner. As herein illustrated, the frame of the modified structure includes U-shaped side frame members 60, 62; top and bottom frame members 64, 66; and louver blades 68, all of which may be similar in cross-sectional shape to the corresponding elements previously described with respect to the fixed type of louver. The modified louver structure may also be provided with similar upper and lower corner braces 70, 72, and similar angle supports 74 may be provided for the bottom frame member 66, as shown.

The adjustable louver blades 68 are herein illustrated as supported at each end upon hinge plates 76 having pivots 78 extended laterally therefrom. The pivots 78 are mounted in openings formed in side channels 80 attached to the side frame members 60, 62 by screws 82 and nuts 84, as shown in detail in Fig. 12. A sheet 85 of flexible material, such as rubber, may and preferably will be interposed between the hinge plates 76 and the louver blades 68, and as illustrated in Fig. 10, the outer edge of each interposed sheet 86 extends beyond the end of the louver blade and engages the face of the side channel 80.

Each louver blade 68 is further provided with a pair of blade connectors 86 having rearwardly extending arms 88 which are connected together by tie bars 90. The lower end of each tie bar 90 is connected by a link 92 to an operating arm 94 pivotally mounted in a bracket 96 secured to the rear flanges of the bottom frame 66. The outer ends of the operating arms 94 are provided with laterally extended flanges 98 secured to a tie bar 100 and may be used as a handle for raising or lowering the linkage to effect rocking of the pivotally mounted louver blades 68.

The louver structure is further provided with a centrally disposed front tie piece 102 connecting the front flanges of the top frame 64, and with two spaced reinforcing angles 104 vertically extended for substantially the full height of the structure and connecting the top and bottom frames 64, 66, as shown. In order to lock the louver blades 68 in their adjusted position, a pair of slotted links 106 are provided, the links being pivotally secured to an intermediate portion of the associated tie bar 90. The slotted end of each link 106 is adjustably connected by a bolt 108 to its adjacent reinforcing angle 104, the bolt extending through the slot and one leg of the angle bar and being provided with a washer and lock knob 110 which may be tightened to lock the linkage in its adjusted position.

As herein illustrated, the cross-sectional shape of each louver blade 68 provides oppositely bent flange portions 112 at the marginal edges thereof, each flange portion having a rib portion 114 extended at right angles from the flange, the ribs 114 being extended in opposite directions. With this construction it will be seen that when the blades 68 are moved to their closed positions, the rib portions 114 of adjacent blades engage the flat portions of their cooperating blades, thus providing two weather seals in spaced relation along the engaging faces of adjacent louvers. It will also be observed that the inclined inner faces 116, 118 of the top and bottom frames are each provided with a closure member 120, 122 secured thereto for cooperation with the top edge of the upper blade and the bottom edge of the lower blade respectively when in their closed positions. The upper closure member 120 comprises an elongated strip of sheet metal having a base portion 124, a vertically depending portion 126, and a right angle rib portion 128 extended outwardly therefrom. The lower closure member 122 is of similar cross section in inverted relation having a base portion 125, an upstanding portion 127 and a right angle rib portion 129 extended inwardly therefrom. As herein shown, the base portions of the closure members are bolted to the inclined faces 116, 118 of their respective top and bottom frames. It will be seen that the closure members are located to cooperate with the upper and lower blades respectively when the marginal edges of adjacent blades are in their engaged or closed position.

It will be observed that the upper and lower ends of the side channels 80 terminate within the space between the inner faces 116, 118 of the top and bottom frames 64, 66 respectively and are cut at an angle corresponding to such inclined faces. It will be understood that the modified louver structure is also adapted to have the U-shaped filler member 52 fitted thereon and secured thereto in the manner previously described, when necessary to increase the height thereof to fit a particular wall opening.

Referring now to Fig. 13, the adjustable type of louver structure therein shown is similar in construction to the louver above described except that provision is made for adjusting the louvers by means of a conventional worm and worm gear unit, indicated generally at 130, which may be employed when a plurality of louver units are connected in tandem whereby to effect simultaneous adjustment of all the louver units with a minimum of effort. As herein shown, the worm gear unit 130 is provided with a hand wheel 132 fast on the input shaft 134, the output shaft 136 of the worm gear unit being connected to a pipe shaft 138. The worm gear unit is supported by a bracket 140 secured to one of the vertical reinforcing angles 104 attached to the rear of the louver structure. A bearing member 142 attached to the other reinforcing angle 104 supports the other end of the pipe shaft 138, as shown in Fig. 16. The pipe shaft 138 is provided with two operating arms 144 fast thereon and connected by links 146 to the operating tie bar 100, as shown in Fig. 13. In operation, rotation of the hand wheel in one direction will effect closing of the louvers through the linkage previously described, and rotation in the other direction will effect opening of the louvers, any intermediate position of adjustment being maintained by virtue of the worm and worm gear connections.

Provision is also made for limiting rotation of the adjusting unit in either direction, and as herein shown, the pipe shaft 138 is provided with a radial extension 148 arranged to engage either one or the other of set screws 150, 152 adjustably mounted in spaced lateral extensions from the worm gear bracket 140. As indicated at 158, 160 the pipe shaft may be extended on either side for connection to additional louver units to effect simultaneous operation thereof.

When the louver units are disposed a relatively high distance above the floor out of reach of an operator, the input shaft 134 of the worm gear unit may be provided with a chain and pulley drive 162, as illustrated in Fig. 14, wherein the chain may be extended downwardly within reach of the operator. Another expedient for operating the louver units from a distance remote therefrom is illustrated in Fig. 15 wherein the worm gear unit 130 is supported in a position at right angles to that shown in Figs. 13 and 14, and the input shaft 134 is provided with a pipe shaft extension 164 which may extend to a convenient height above the floor and be provided with an operating handle 165, as shown.

Provision is also made for detachably securing screening to the front of the louver units, as illustrated in Figs. 17 to 21. The screens, indicated generally at 167, 168 may comprise metal rod frames having any suitable screening material attached thereto, and are made of a size such as to overlap the openings to be screened. The screens may be clamped to the front flanges of the top and bottom frames 14, 16 and to the side frames 10, 12 by similar clamping units 170, 172, 173, the upper clamping unit 170 being shown in Fig. 19, and which may comprise an L-shaped clip 174 placed over the marginal edge of the screen, one leg of the clip extending over the face of the screen. The clip is secured in clamping relation by a bolt 176 which is first secured to its adjacent frame member by a nut and washer 178. The bolt extends through the screen and the overlying leg of the clip and is provided with a second nut and washer 180 which effects clamping of the clip and the screen to its adjacent frame portions.

As illustrated in Fig. 20, the attachment of the screens to the center mullion strip 50 of the louver may be effected by clip members 186 bridged across the marginal edges of two adjacent screens and clamped thereto by a central bolt 188 secured to the mullion strip 50 by a nut and washer 190, the bolt being extended through the clip and provided with a second nut and washer 192 for clamping the edges of the screen to the marginal edges of the mullion strip. A modified form of mullion strip 194 shown in Fig. 21 may be formed by bending a length of sheet metal to form an upstanding central partition 196. The strip 194 is secured to the upper and lower frame members 64, 66 of the adjustable louver units and the adjacent edges of the screens may be individually secured to the marginal edges of the mullion strip by clip members similar to those used at the top, bottom and side edges wherein the L-shaped clips 174 cooperating with the bolts 176 and the nuts and washers shown are employed to clamp their respective screens to the center mullion.

From the above description it will be seen that the present louver structure lends itself to manufacture in a variety of sizes from a minimum number of parts in either the fixed or movable blade structure in an easy and simple manner to form a rigid and superior sheet metal louver.

From the description thus far and an inspection of the drawings it will be observed that the present construction of louver embodies many duplicate and identical parts, and the fact that the parts are identical both as to shape and size enables production of louvers of various heights and dimensions to be made using a maximum of standardized parts or components, and this enables the louvers to be produced at minimum expense. In practice the louver blades for both the fixed and the movable louver structures may and preferably will be of the same cross-sectional shape and may be installed one behind the other without interference.

It will be observed that the manual adjusting device comprising the links 106 and bolts 108 as shown in Figs. 7 and 9 are adapted to lock the blades firmly in any intermediate open position whereby to prevent fluttering of the louver blades when hit by the wind. It will also be observed that the louver blades 68 are automatically locked in their closed position by the structure of the toggle linkage shown in Fig. 8 so as to prevent fluttering or vibration under wind pressure, and that such structure also serves as a safety feature such that when the louver is closed, entrance cannot be gained from the outside by pressure against the louver blades. In practice pulling the handle 100 from the inside to rock the arm 94 will break the toggle to permit opening of the louver.

While the preferred embodiment of the invention has been herein illustrated and described, it will be understood that the invention may be embodied in other forms within the scope of the following claims.

Having thus described the invention, what is claimed is:

1. A louver having, in combination, a frame, a plurality of vertically spaced louver blades pivotally mounted in said frame, each blade having a cross sectional shape defined by an inclined blade portion, vertical front and rear flanges extended from the edges of said inclined portion, each flange having a relatively short inwardly extended rib, means for rocking said blades, said blades being spaced to effect overlapping of adjacent edges when closed to present the rib portions of adjacent blades into engagement with the inclined portions of their cooperating blades to form two spaced weather seals along the engaging faces of adjacent blades when closed, and stop means carried by said frame at the top and bottom thereof engageable by a rib on the upper and lower blades to form weather seals therewith when said blades are in their closed position.

2. A louver as defined in claim 1 wherein the stop means comprises top and bottom louver blades fixed in said frame and provided with extensions extending the full width of said frame for cooperation with the ribs of the adjacent upper and lower pivoted louver blades when the latter are in their closed position to form said weather seals.

3. A louver as defined in claim 1 wherein each pivotal mounting includes a hinge plate connected at each end of a louver blade and a pin extended from each hinge plate into openings in said frame, and a flat rubberlike sheet supported between each blade and its hinge plate having one edge extended beyond the end of the louver blade into wiping engagement with the adjacent surface of said frame to provide a weather seal along said end.

4. A louver having, in combination, a frame; a plurality of vertically spaced louver blades pivotally mounted on said frame; and means for rocking said blades including arms extending horizontally rearwardly from said blades when said blades are in full open position, a tie bar having a pivotal connection with each of said arms, an operating arm at the rear of said frame, means pivotally connecting the lower end of said operating arm with said frame, and a link having one end pivotally connected with said operating arm and its opposite end pivotally connected with said tie bar, said operating arm occupying a position extending upwardly and away from said frame when said blades are in full open position and adapted to have its upper end moved toward said frame to effect closing of said blades, the pivotal connections of said tie bar with said arms and link, and the pivotal connection of said operating lever with said frame lying in a substantially common vertical plane when said blades are in full open position, and the pivotal connections of said tie bar with said arms and said link being movable, upon actuation of said operating arm to full closed position, to a vertical plane disposed closer to said frame than the vertical plane passing through the pivotal connection of said operating arm with said frame, whereby a toggle action is provided for locking the blades in closed position and preventing opening of the blades from the front of said frame.

5. A louver as defined in claim 4 which includes means for manually locking the blades in their adjusted position including a slotted link pivotally connected to said tie bar and fastening means extended through the slotted portion of the link and a portion of the frame.

References Cited in the file of this patent

UNITED STATES PATENTS

| | | |
|---|---|---|
| 1,014,679 | Von Wagner | Jan. 16, 1912 |
| 1,217,225 | Schueler | Feb. 27, 1917 |
| 1,496,378 | Reichardt | June 3, 1924 |
| 1,657,625 | Hoal | Jan. 31, 1928 |
| 1,785,682 | Hamilton | Dec. 16, 1930 |
| 2,265,881 | Weinberg | Dec. 9, 1941 |
| 2,309,717 | Siebenlist | Feb. 2, 1943 |
| 2,356,325 | Larsen | Aug. 22, 1944 |
| 2,373,416 | Renton | Apr. 10, 1945 |
| 2,394,059 | Hite | Feb. 5, 1946 |
| 2,480,562 | Ewing | Aug. 30, 1949 |
| 2,574,344 | Miller | Nov. 6, 1951 |

FOREIGN PATENTS

| | | |
|---|---|---|
| 208,373 | Great Britain | Dec. 20, 1923 |
| 317,963 | Great Britain | Aug. 29, 1929 |